March 20, 1951  R. S. KINKEAD  2,545,520

SPIDER FOR LAWN MOWER REELS

Filed Jan. 12, 1949

Inventor
ROBERT S. KINKEAD
By Caswell & Lagaard
Attorneys

Patented Mar. 20, 1951

2,545,520

UNITED STATES PATENT OFFICE 2,545,520

SPIDER FOR LAWN MOWER REELS

Robert S. Kinkead, St. Paul, Minn.

Application January 12, 1949, Serial No. 70,412

3 Claims. (Cl. 56—294)

1

My invention relates to lawn mowers and particularly to the cutting reel thereof.

An object of the invention resides in providing the reel with a spider having great strength and rigidity.

Another object of the invention resides in providing a spider constructed entirely of sheet metal.

A still further object of the invention resides in providing the spider with a body having lugs bent outwardly therefrom and to which the cutting blades of the reel are attached and to further provide reinforcing means integral with the body and lugs for stiffening the spider and for reinforcing the lugs.

An object of the invention resides in providing the spider with flanges integral with the body and lugs and extending angularly with reference to the lugs.

Other objects of the invention reside in the novel combination and arrangement of parts and in the details of construction hereinafter illustrated and/or described.

In the construction of reel spiders the common practice has been to use metal castings. Castings are never accurate and considerable variation exists between different cast spiders. In addition appreciable machining is required when using castings thus materially increasing the cost of the reel. Castings as a rule to be made sufficiently strong must be fairly heavy and when so constructed add to the weight of the mower thus producing a heavy running mower. Attempts have been made to use stamped spiders but such spiders have been weak and would readily yield or bend so that adjustment of the cutting blades relative to the bed knife could never be maintained. The instant invention provides a construction whereby lightness, strength and rigidity may be procured without the disadvantages of the forms of spiders heretofore employed.

Figure 1:
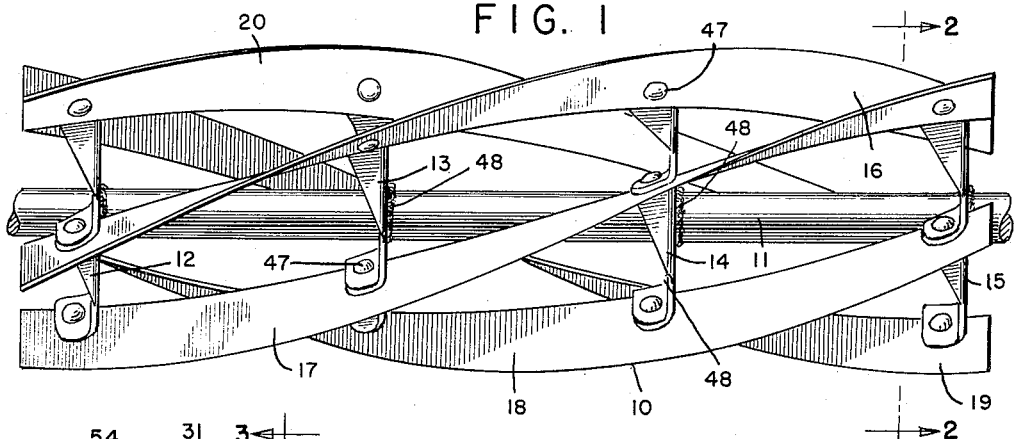
Fig. 1 is a plan view of the reel of a lawn mower illustrating an embodiment of my invention.

For the purpose of illustrating my invention I have shown in Fig. 1 a lawn mower reel 10 comprising a shaft 11. On the shaft 11 is mounted a number of spiders 12, 13, 14 and 15 which support the usual cutting blades 16, 17, 18, 19 and 20. These blades are preferably twisted in the form of helix and function to progressively engage the bed knife and to cut the grass in the customary manner.

Figure 2:
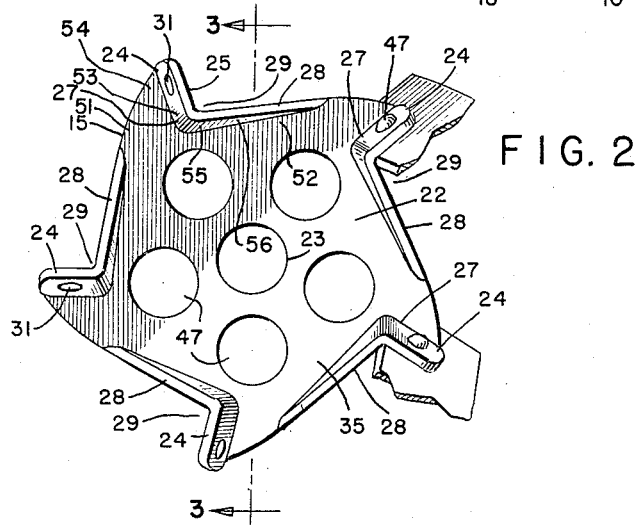
Fig. 2 is a cross sectional view of the reel taken on line 2—2 of Fig. 1.
Figure 3:
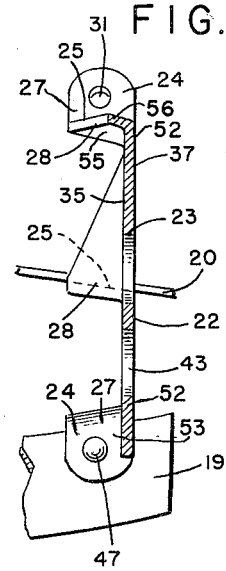
Fig. 3 is an elevational sectional view taken on line 3—3 of Fig. 2.

All of the spiders 12, 13, 14 and 15 being identical in construction only the spider 15 which is shown in detail in Figs. 2 and 3 will be described. The spider 15 consists of a body 22 in the form of a pentagon having a central hole 23 in the same. At the marginal portion 50 of the body 22 are provided five notches 29 which form in the body 22 toothed projections 51 having substantially radial edge portions 54 and which notches further form in said body spiraling edge portions 52 which spiral outwardly from the inner ends of the radial edge portions 54 of said projections. Said spider further comprises lugs 24 which are bent outwardly from said body. These lugs have faces 25 which are substantially radial and which extend helically to conform to the lead of the blades 16, 17, 18, 19 and 20. The said lugs further have radial edge portions 53 which are integral with the edge portions 54 of the projections 51 of the body 22 and in addition have longitudinally extending edge portions 27 projecting outwardly from the body 22. Extending angularly from the lugs 24 are flanges 28 which have longitudinally extending edge portions 55 and circumferentially extending edge portions 56 which are respectively integral with the longitudinal edge portions 27 of lugs 24 and the spiraling edge portions 52 of the body 22. These flanges lie in continuation of the lugs 24 and form in conjunction therewith the notches 29 which face outwardly. The lugs 24 have holes 31 in them and by means of which the blades of the reel may be attached to the spiders.

Figure 4:
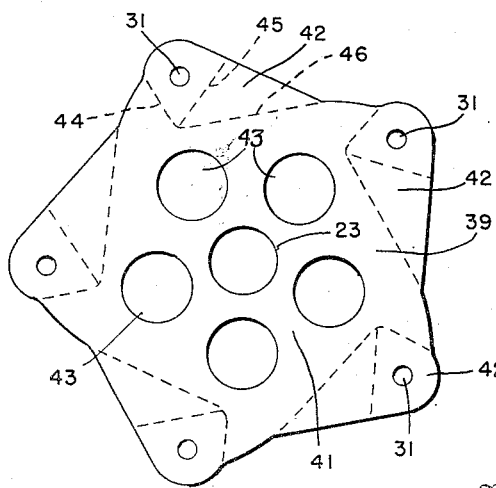
Fig. 4 is a developed view of the blank from which the spider shown in Fig. 2 is constructed.

In the construction of the spider a blank 39 is employed such as shown in Fig. 4 and which is fabricated from sheet metal of sufficient thickness to give the desired rigidity to the spider. This blank has a central portion 41 from which the body 22 of the spider is formed and lobes 42 extending circumferentially about the same and from which the lugs 24 and flanges 28 are formed. The central portion 41 has the hole 23 formed in it and in addition other holes 43 which lighten the spider without materially reducing the strength of the same. The blank in being stamped is bent along lines 44, 45 and 46 at each of the lobes 42 to form the lugs 24 and the flanges 28. The holes 31 may be formed in the blank 39 prior to stamping or if greater accuracy is desired after the formation of the lugs.

In the assembly of the parts the spiders are mounted on the shaft 11 and the blades 16, 17, 18, 19 and 20 attached to the same. This is accomplished by placing the blades in the notches 29 and against the surfaces 25 of the lugs 24. Rivets 47 are then inserted through the holes 31 in said lugs and through similar holes, not shown, in the said blades and upset. The spiders may then be secured to the shaft 11 by any suitable means as for example by welding as indicated at 48. The entire assembly then becomes a unitary structure having great strength and rigidity.

The advantages of my invention are manifest. The spider can be constructed from sheet metal and at an extremely low cost as compared to cast spiders. The spider when constructed as disclosed is extremely light in weight and rigid in construction thereby preventing chattering in use and maintaining adjustment. The flanges issuing from the lugs reinforce said lugs and at the same time greatly stiffen the entire spider.

Changes in the specific form of my invention, as herein described, may be made within the scope of what is claimed without departing from the spirit of my invention.

Having described my invention, what I claim as new and desire to protect by Letters Patent is:

1. A spider for lawn mower reels constructed from sheet metal and having a plate like body symmetrical about a central axis, plate like lugs extending outwardly from said body at the outermost portion thereof and having faces disposed in substantially radial positions and to which the blades of the reel may be attached, said lugs each having a radial edge portion and an inner longitudinally extending edge portion, said lugs along the radial edge portion being integral with said body, and a flange integral with said body and having a longitudinally extending edge portion integral with the inner longitudinally extending edge portion of the lug.

2. A spider for lawn mower reels constructed from sheet metal and having a plate like body symmetrical about a central axis, said body having circumferentially spaced angular notches forming toothed projections therebetween, said notches forming edge portions at said projections substantially radial and edge portions at the outermost portion of the body spiralling outwardly from the inner ends of the radial edge portions of said projections, lugs extending outwardly from said projections and having substantially radial edge portions integral with the radial edge portions of said projections, and flanges extending outwardly from said body, said flanges having edge portions integral with the edge portions of said body and other edge portions integral with the inner longitudinally extending edge portions of said projections.

3. A spider for lawn mower reels constructed from sheet metal and having a plate like body symmetrical about a central axis, said body having circumferentially spaced angular notches forming in said body angularly disposed edge portions, lugs extending outwardly from said body at certain of the edge portions of said body and integral therewith, and flanges extending outwardly from the other edge portions of said body and integral therewith, said flanges being integral with said lugs.

ROBERT S. KINKEAD.

REFERENCES CITED

The following references are of record in the file of this patent:

UNITED STATES PATENTS

| Number | Name | Date |
| --- | --- | --- |
| 2,043,098 | Funk | June 2, 1936 |
| 2,251,905 | Davis et al. | Aug. 12, 1941 |
| 2,460,111 | Worthington | Jan. 25, 1949 |
| 2,495,372 | Goldberg | Jan. 24, 1950 |